Sept. 29, 1925.
C. A. HORNER
SPROCKET CHAIN
Filed Jan. 12, 1925
1,555,577
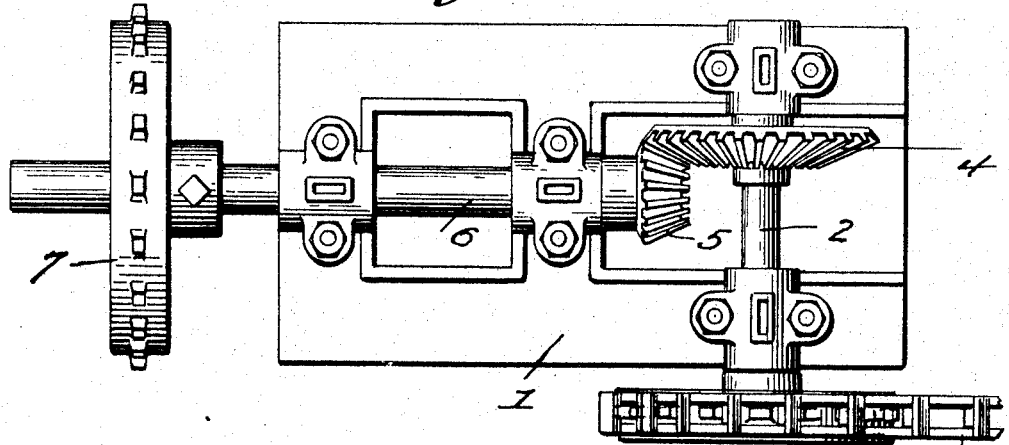
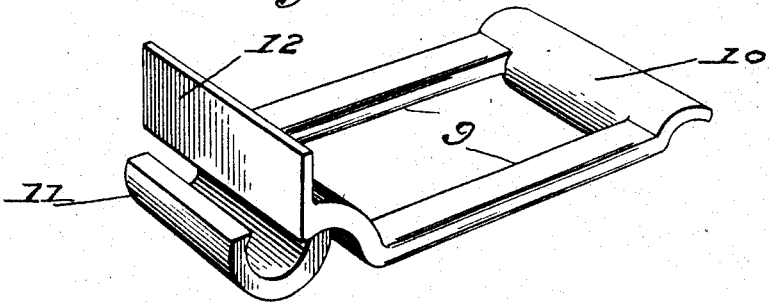
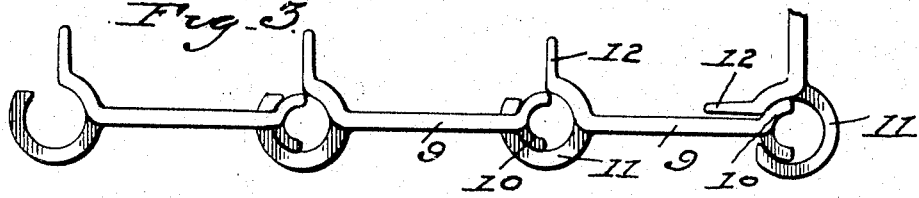
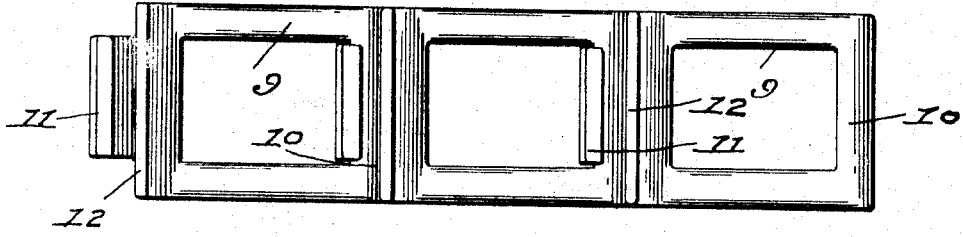
Inventor
Charles A. Horner
By
Attorney Patented Sept. 29, 1925.

1,555,577

UNITED STATES PATENT OFFICE.

CHARLES ASBURY HORNER, OF CLEVELAND, TENNESSEE.

SPROCKET CHAIN.

Application filed January 12, 1925. Serial No. 1,843.

*To all whom it may concern:*

Be it known that I, CHARLES A. HORNER, a resident of Cleveland, in the county of Bradley and State of Tennessee, a citizen of the United States, have invented certain new and useful Improvements in Sprocket Chains, of which the following is a specification.

My invention relates to improvements in sprocket chains of the saw-dust type, and is especially adapted for use as a conveyor chain in removing sawdust and other material.

The primary object of the invention is to construct the links of the chain in such manner that all of the links in the chain may be used with scrapers thereon. In the usual construction, the prohibitive cost of scraper links prevents the use of scrapers on all the links of the chain. By the utilization of my invention I am enabled to equip each of the links of the chain with scraper blades.

Each link including its scraper blade, is fashioned from a single piece of metal, in such manner that the cost of production of these particular links is no greater than the cost of production of the links in the customary sprocket chains.

The invention consists in certain novel features of construction and combination and arrangements of parts as will be hereinafter more fully set forth and claimed.

In the accompanying drawings I have illustrated one complete example of the physical embodiment of my invention wherein the parts are combined and arranged according to the best mode I have so far devised for the practical application of the principles of my invention.

Figure 1 is a plan view showing the mechanism for driving the sawdust chain and illustrating a portion of the chain.

Fig. 2 is an enlarged perspective view of one of the links of the chain, showing the scraper blade thereon.

Fig. 3 is a view in side elevation of a portion of a sawdust chain involving my invention, the link at the right end being turned up to illustrate the manner of detaching a link from the chain.

Fig. 4 is a plan view showing the connection of several links of the chain.

In order that the general arrangement of parts may readily be understood, I have shown in Figure 1 a frame base 1 upon which the sprocket shaft 2 is journaled. The sprocket wheel 3 on the shaft 2 is used to support one end of the sawdust chain or conveyor, and the shaft 2 is driven through the gear couples 4 and 5 from a driving shaft 6 journalled in the base or frame 1. The shaft 6 has a sprocket wheel 7 thereon, and suitable sprocket drive mechanism is employed to operate the two shafts 6 and 2.

The conveyor chain or sawdust chain is indicated as a whole in the drawings by the numeral 8. This chain is made up of identical links 9, each fashioned from a single metal blank in a die machine or other machine suitable for stamping or fashioning the open links from a single metal blank.

At one end of each link is formed a semicircular transversely arranged flange 10, which is made up of the metal at one end of the link, and of a portion of the metal struck from the body of the open link. This semicircular flange extends transversely of the link, and as shown in Fig. 2, is the full width of the body of the link.

At the opposite end of the link a semicircular flange 11 is fashioned which, as shown, is narrower than the flange 10, and the main portion of this smaller flange 11 is struck from the body of the open link 9.

These two semi-circular flanges 10 and 11 are of complementary diameters to insure the formation of a hinge sleeve between adjoining links as shown in Fig. 3. The links are separable and may be detached by turning one link up as shown in Fig. 3 in order that the flange 11 may be slid off of the flange 10. In forming the chain a link is turned up at the angle illustrated in Fig. 3 and the flange 11 is slid over the flange 10 to proper position, and then the link is turned down parallel with the chain. In this position the narrower flange 11 is retained against lateral displacement between the side bars of the open link 9.

As before stated each of the links is provided with an integral scraper blade as 12. This blade which extends the full width of the link is fashioned by bending or turning up one end of the link, preferably at right angles to the plane of the body of the link. A curved or arcuate portion 13 which forms part of the large flange 11 is also fashioned between the body of the link and the scraper blade 12.

The two flanges 10 and 11 thus form a hinge sleeve and when the links are in proper position the scraper blades 12 project approximately at right angles from the plane of the chain. The hinged sleeves form durable and flexible joints in the chain, and as before stated lateral displacement of the links is prevented by the coaction of the narrow flanges 11 in combination with the side bars of the links 9.

It will thus be seen that each of the links of the chain is equipped with a scraper blade and the conveyor, or sawdust chain is thus made more efficient without increasing the cost of production or manufacture of the chain. The links are all standardized and it will be apparent that repairs or replacements may be made with facility, and the efficiency of the chain maintained at comparatively low cost.

Having thus fully described my invention what I claim as new and desire to secure by Letters Patent is:

A sprocket chain consisting of links, each made from a single piece of flat metal and consisting of a pair of side pieces, an upward curved portion at one end of said side pieces, a similar curved portion at the other end of said side pieces formed with an upward extending scraper blade and a lower open curved hook.

In testimony whereof I hereunto affix my signature.

CHARLES ASBURY HORNER.